United States Patent [19]
Dorsey et al.

[11] 3,838,311
[45] Sept. 24, 1974

[54] STORAGE TUBE FOCUS CONTROL

[75] Inventors: Denis Peter Dorsey, Levittown, Pa.; William E. Rodda, Trenton, N.J.

[73] Assignee: RCA Corporation, New York, N.Y.

[22] Filed: Mar. 1, 1973

[21] Appl. No.: 337,011

[30] Foreign Application Priority Data
Apr. 24, 1972 Great Britain .................... 19019/72

[52] U.S. Cl. .................. 315/12, 315/31 R, 315/8.5, 340/173 CRT
[51] Int. Cl. ............................................ H01j 29/70
[58] Field of Search ............ 315/31, 30, 27, 22, 1 B, 315/10–12

[56] References Cited

UNITED STATES PATENTS 2,931,938 4/1960 Patrick et al. .................. 315/31 TV
3,426,238 2/1969 Gibson ................................ 315/12

*Primary Examiner*—Maynard R. Wilbur
*Assistant Examiner*—J. M. Potenza
*Attorney, Agent, or Firm*—Eugene M. Whitacre; Charles I. Brodsky

[57] ABSTRACT

That loss of resolution which results in the image recorded in a storage tube when writing with high voltages which cause secondary emission can be minimized, in accordance with the invention, by reducing the bias voltage on its focus electrode when the storage tube is changed from its "READ" to its "WRITE" mode of operation.

5 Claims, 1 Drawing Figure

PATENTED SEP 24 1974
3,838,311
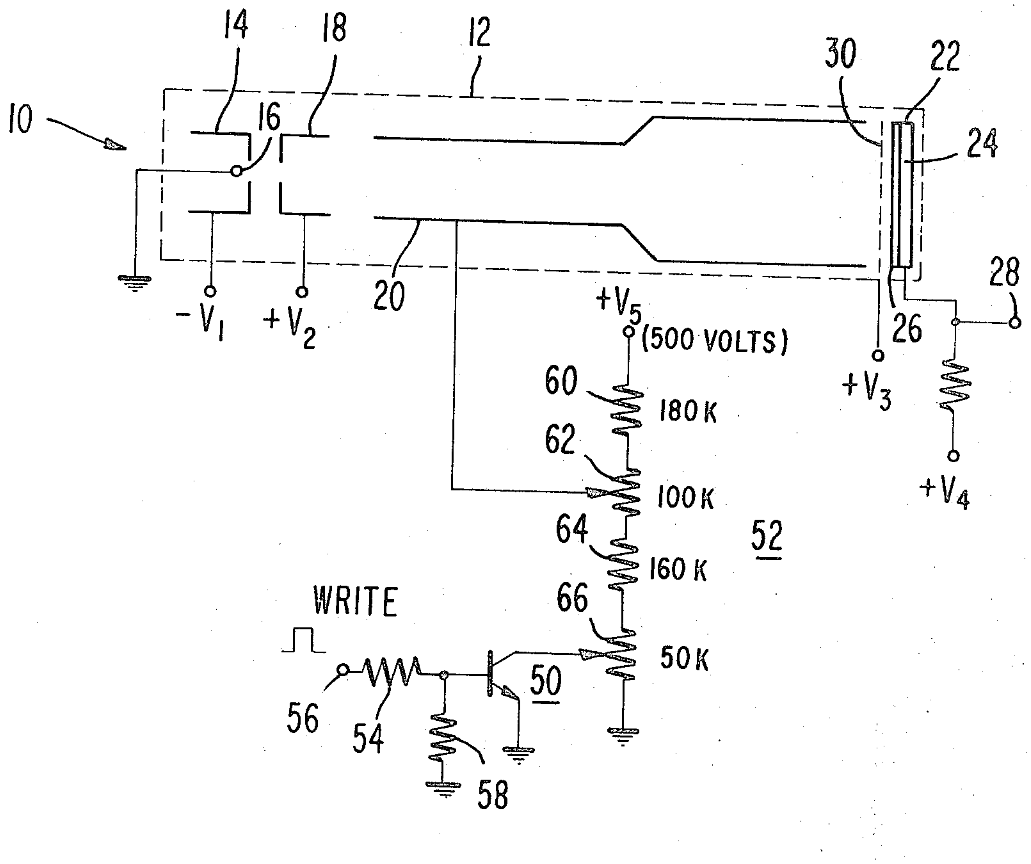

STORAGE TUBE FOCUS CONTROL

FIELD OF THE INVENTION

Pending U.S. Pat. application Ser. No. 257,412, filed May 26, 1972, and entitled "TELEPHONE IMAGE TRANSMISSION SYSTEM" describes a system which is capable of transmitting still television pictures of three-dimensional objects over communications channels such as long-distance unequalized voice-grade telephone lines. A television camera is therein employed to continually provide a video signal to a storage tube in which any one video frame of information can be "frozen." The single frame stored--i.e., the picture to be transmitted-- is then converted to an audio frequency signal for transmission over telephone type communications links to a remote receiver location, where a second storage tube is used to store the audio frequency information transmitted. Upon completion of the transmission, the audio information stored at the receiver is converted back to a video signal for viewing on a monitor. The transmitted signal is essentially frequency modulated, in that its instantaneous frequency is directly proportional to the brightness level of the stored picture element then being transmitted.

Such a transmission system has been termed "simplex," in that transmissions always travel in the same direction along the telephone link. In a "half-duplex" system, on the other hand, transmissions can proceed in either direction, but not simultaneously. Experimentation has shown that system performance can be enhanced when the focus electrode of the storage tube is biased to a first voltage when the tube is to be used in its WRITE Mode of operation and to a second, different voltage when the tube is to operate in its READ mode.

To be more specific, when the storage tube is used to record television information--either in the "freezing" of a television frame for transmission or in the "recreating" of that transmission received from the telephone line--that potential which is applied to the storage tube target is sufficiently high to cause the emission of secondary electrons from the insulating areas on the target surface. Because the focusing nodes of the helical path traversed by the scanning beam in traveling from the electron gun of the storage tube to its target surface are determined through the cooperative action of the target and focus electrode voltages, any change in the one, without an offsetting change in the other, can displace these nodes, so that the electron beam does not precisely image onto the target surface in establishing the image charge pattern. For the case where the focus electrode voltage is initially established with a target potential corresponding to that used in the reading out of an image from the storage tube--either for application to the audio communications link for transmission to a remote receiver or for application to a monitor upon which the received picture is to be displayed--it will be readily apparent that a change in focus voltage should follow whenever the target potential is altered to switch the storage tube from its READ mode of operation to its WRITE mode.

SUMMARY OF THE INVENTION

As will become clear hereinafter, the present invention comprises apparatus for setting the bias voltage on the focus electrode of the storage tube at that level which permits high resolution reading from the storage tube target surface when the tube is to operate in its READ mode. The apparatus further serves to automatically reduce that bias voltage when the storage tube is switched to operate in its WRITE mode. A resistive voltage divider network is employed, along with a transistor which is biased into conduction during the WRITE operation to reduce the resistance in the divider network and correspondingly re-adjust the bias voltage developed. When the storage tube is switched again to its READ mode, the transistor is rendered nonconductive and the resistive proportioning is re-established.

BRIEF DESCRIPTION OF THE DRAWING

These and other features of the present invention will be clearly understood from a consideration of the following description taken in connection with the accompanying drawing which shows a preferred embodiment of focus control apparatus for a storage tube constructed in accordance with the invention.

DETAILED DESCRIPTION OF THE DRAWING

The storage tube of the drawing is represented by the reference numeral 10, and comprises an envelope 12, a control grid 14, a cathode 16, an accelerating anode 18, a wall or focus anode 20, a target 22 which comprises a substrate 24 and a mosaic layer 26, an output terminal 28 and a grid mesh 30. The target of the storage tube 22 may, in one construction, consist of a coplanar array of silicon dioxide insulators (26) on a relatively square p-type silicon wafer (24), on which, using standard photo-lithographic techniques, it is possible to etch approximately 600,000 of these elements per square centimeter. Each element can be selectively charged by controlling the electron beam directed at it from the cathode 16.

Once a particular charge pattern is established on the insulator elements, the charge is essentially nondestructive and can be utilized to modulate another fixed biased electron beam directed to the substrate from the cathode 16. To afford this READ mode of operation, it is necessary to prepare the target surface, charge the insulators 26 by controlling the beam in a WRITE operation, and then switch the substrate 24 to a potential that will permit the charge to remain.

When the target 22 is being scanned by the electron beam in the READ mode, the silicon dioxide insulators 26 will be negative with respect to the cathode of the storage tube 16. The charge distribution on the insulating surface will then be a function of the stored image laid down during the WRITE Operation and of the substrate bias. As the beam scans across the target 22, the total number of electrons reaching the substrate 24 will be inversely proportional to the negative charge on the insulators 26. For example, in a typical storage tube utilized with a READ potential of +8 volts on the substrate 24, an insulator potential of −4 volts might prevent any electrons from reaching the substrate. Those electrons which are repelled by the insulator surface 26 will then be attracted to the separate mesh grid 30, while those electrons that reach the target substrate 26 form the signal current of the storage tube developed at output terminal 28.

Because the insulator 26 is negative with respect to the cathode during this READ mode of operation, none of the electrons directed at the target 22 from the cathode 16 will land on the insulator surfaces. Therefore, during the READ mode, the insulator surface will not discharge and, hence, the charge pattern formed there will be essentially non-destructive. However, the vacuum in the storage tube is not generally perfect, and gas molecules inside the tube--particularly those between the mesh grid 30 and the target 22--will become ionized by electron collision. These collisions will, in turn, create positive ions that will be attracted to the insulating surface, and they will slowly discharge the stored image even during the READ mode of operation. Due to the construction of the storage tube --and depending particularly on the insulator thickness, the substrate biasing, the target uniformity, the vacuum in the tube, and the type of video information stored--the target can be continuously scanned for as long as 15 minutes without a noticeable loss of stored information.

It will be seen, furthermore, that this READ time and the "storage" time are not exactly the same. The "storage" time corresponds to that length of time that the tube will retain a stored image when it is not being continuously scanned. Since the dielectric relaxation time of silicon dioxide is on the order of $5 \times 10^6$ seconds, once the beam is biased "off," images can be stored on the insulating surface for weeks.

During the ERASE mode of operation, the insulator voltage of the storage tube is increased so that each incremental dielectric area will be positive with respect to the cathode. Since the insulator 26 is physically attached to the substrate 24, increasing the substrate's bias from the +8 volt READ potential to a relatively higher positive voltage (e.g., +20 volts) will insure the insulator 26 is positive with respect to the cathode 16. The target is then scanned with the control grid 14 grounded until the insulator surface is discharged to approximately the catode potential.

If the target is repeatedly scanned in the ERASE mode, the insulator 26 will continue to discharge to an equilibrium potential whereby all of the storage elements will be at the same voltage. Generally, the length of time for the insulator to reach this equilibrium will be five television frames. Because erasing of the storage target only occurs where the electron beam lands with proper electrode biasing, selective controlling of the deflection size and center of the electron beam raster will control those portions of the target as are to be erased.

After the insulator 26 has been erased, the target will be ready to store a charge pattern. With the storage tube utilized in accordance with the invention, the process is designated as a WRITE Process, and is accomplished by secondary beam emission. During the WRITE operation, electrons strike the silicon dioxide insulators at a high energy potential so that the ratio of secondary electrons to primary electrons will be greater than unity. This means that the net flow of electrons will be away from the insulator, causing it to charge positively. To achieve the high impact energy needed to cause this secondary emission, the target's substrate 24 is increased from the ERASE potential of +20 volts to the WRITE potential of approximately +200 volts. This causes the insulator's potential to increase to approximately +180 volts, a voltage which is well above the value required to create secondary emission.

When a full television frame is to be stored on the target's insulator, the substrate 24 must be maintained at +200 volts for the entire frame interval. At the same time, the tube's control grid 14 is biased to a negative level of approximately −60 volts and modulates the electron beam with the one-frame video signal. While the grid modulates the beam, it also effectively controls the charge deposited on the insulator 26, and the instantaneous bias applied to the grid 14 will be inversely proportional to the charge placed on the insulator 26. Because writing occurs where the modulating beam strikes the target, to selectively record video information, the beam must first be appropriately sized and centered and the WRITE cycle then initiated.

As so far described, the storage tube is similar to that disclosed in application Ser. No. 152,746, filed June 14, 1971, and entitled "TELEVISION FRAME STORAGE APPARATUS", now U.S. Pat. No. 3,740,465. However, during operations with such storage tube, it has been noted that the resolution with which an image is formed on the insulators 26 during the WRITE mode of operation depends upon that relationship which exists between the voltage on the substrate 24 and the voltage which is applied to the focus electrode 20. More particularly, it has been noted that if the storage tube 10 is initially biased for the READ mode of operation, then, unless the focus electrode bias is altered when the tube is switched to its WRITE mode, a measurable loss of resolution results. Investigations have shown that this follows from the helical path which the electron beam scans down the length of the storage tube to image its charge pattern onto the insulators of the target. That is, where the focusing nodes can be made to fall on the target surface for READ operation with a substrate voltage of +8 volts and a focus electrode potential of some +330 volts, such nodes are displaced forward of the target when the substrate 24 is raised to +200 volts for the WRITE operation.

The re-adjustment of focusing nodes to assure proper imaging for the secondary emission mode of WRITE operation can be achieved, though, by automatically re-adjusting the focus electrode voltage when the WRITE mode of storage tube operation is dictated. Thus, in addition to those storage tube adjuncts described in the U.S. Pat. No. 3,740,465, the present invention further includes a transistor 50--shown as being of NPN type--and a resistive voltage divider 52. As shown, the base electrode of transistor 50 is coupled, first, via a resistor 54 to a control terminal 56 and, second, via a resistor 58 to a point of reference or ground potential--to which the emitter electrode of transistor 50 is also connected. The resistive divider 52 incorporates the series combination of a first resistor 60, a first potentiometer 62, a second resistor 64, and a second potentiometer 66, serially coupled in the order named between a source of positive potential $+V_5$ and ground. With the collector electrode of transistor 50 connected to the variable arm of potentiometer 66 and with the variable arm of potentiometer 62 connected to the focus electrode 20, automatic adjustment of the bias voltage for that latter electrode will follow the application of a positive-going pulse at terminal 56 when the WRITE mode of operation is intended.

In operation--and in the absence of any such pulse at terminal 56--potentiometer 62 is selected in accordance with the values of resistors 60 and 64 and potentiometer 66 to apply to the focus electrode 20 that voltage (e.g., +330 volts) which, in the READ mode of operation with the substrate 24 appropriately biased, will result in high resolution reproduction of the image stored on the insulator surface 26. Adjustment of the variable arm on potentiometer 62 provides a means of vernier control to offset changes in image resolution as components age and/or as temperatures vary. Transistor 50 will, at this time, be non-conductive.

When the WRITE mode of operation follows--the substrate potential is being increased accordingly-- application of the positive-going pulse at terminal 56 renders transistor 50 conductive to short circuit to ground, a portion of the resistance of potentiometer 66. The voltage applied to the focus electrode 20, as a result, will be seen to be reduced in magnitude during this WRITE mode of operation, with the reduction substantially coinciding in time with the rise in substrate potential-- for example, from +20 to +200 volts. With the values illustrated in the drawing, a decrease in focus voltage from some +330 volts to approximately +315 volts was found sufficient to offset the displacement of helical focus nodes which otherwise resulted when the substrate voltage was increased in this manner. As component values might vary with time and affect this automatic refocusing, the variable arm of potentiometer 66 can be adjusted to reestablish the beam landings and offset any decrease in image resolution which could result. It will be seen that this application of the pulse 56, from available logic circuitry operating in conjunction with the storage tube, can thus serve to automatically change the focus electrode biasing in order to permit high resolution imaging to continue.

While there has been described what is considered to be a preferred method of refocusing a storage tube beam during its writing mode of operation, it will be readily apparent that other specific manners of adjusting this focus electrode voltage can be accomplished by those skilled in the art without departing from the teachings herein. Thus, so long as the focus electrode voltage is decreased as one goes from the READ mode of storage tube operation to the WRITE mode of operation--and, correspondingly, as the focus electrode voltage is increased as one goes from the WRITE mode to the READ mode-- continued high resolution signal outputs from the storage tube will be available.

What is claimed is:

1. In an electronic storage device of the type having a target composed of a plurality of insulators arranged on a substrate, input, output, control and focus electrodes, and means for generating an electron beam for applying information signals to the target to establish a desired charge pattern representative thereof upon the writing of said information signals into storage and for thereafter detecting the charge pattern on said target upon the reading of said information signals out of storage, the combination therewith of:

means for applying a first operating potential to said substrate when said electron beam is generated to write said information signals into storage;

means for applying a first bias potential to said focus electrode when said electron beam is generated to write said information signals into storage, the magnitude of which is selected with respect to said first operating potential to position focusing nodes of said generated electron substantially at said substrate;

means for applying a second, different operating potential to said substrate when said beam is generated to read said signals out of storage, with said difference in applied operating potentials being such as to have an undesirable tendency to displace said focusing nodes from said substrate; and means for applying a second, different bias potential to said focus electrode when said beam is generated to read said signals out of storage, to again position said focusing nodes substantially at said substrate.

2. The combination of claim 1 wherein said first bias potential applying means applies a positive bias potential to said focus electrode when said electron beam is generated to write said information signals into storage and wherein said second bias potential applying means applies a more positive bias potential to said focus electrode when said beam is generated to read said signals out of storage.

3. The combination of claim 2 wherein said first operating potential applying means applies a positive operating potential to said substrate when said electron beam is generated to write information signals into storage, wherein said second operating potential applying means applies a second, less positive operating potential to said substrate when said electron beam is generated to read information signals out of storage, and wherein the difference between the positive bias potentials applied to said focus electrode during the writing and reading modes of storage device operation is substantially less than the difference in operating potentials applied to said substrate between said two modes of operation.

4. The combination of claim 3 wherein said first bias potential applying means includes an impedance divider network coupled between a first voltage source and a point of reference potential and wherein said second bias potential applying means includes means for increasing the impedance of said divider network when said electron beam is generated to read said information signals out of storage.

5. The combination of claim 4 wherein said impedance divider network includes a plurality of serially coupled resistances, and wherein said means for increasing the impedance of said divider network includes a transistor coupled across one of said resistances, said transistor being in a conductive condition during the writing mode of operation of said storage device and in a non-conductive condition during the reading mode of said storage device operation.

* * * * *